Sept. 25, 1956  H. C. DIERINGER  2,764,744
CURRENT TRANSFORMER CONSTRUCTION
Filed Oct. 7, 1954
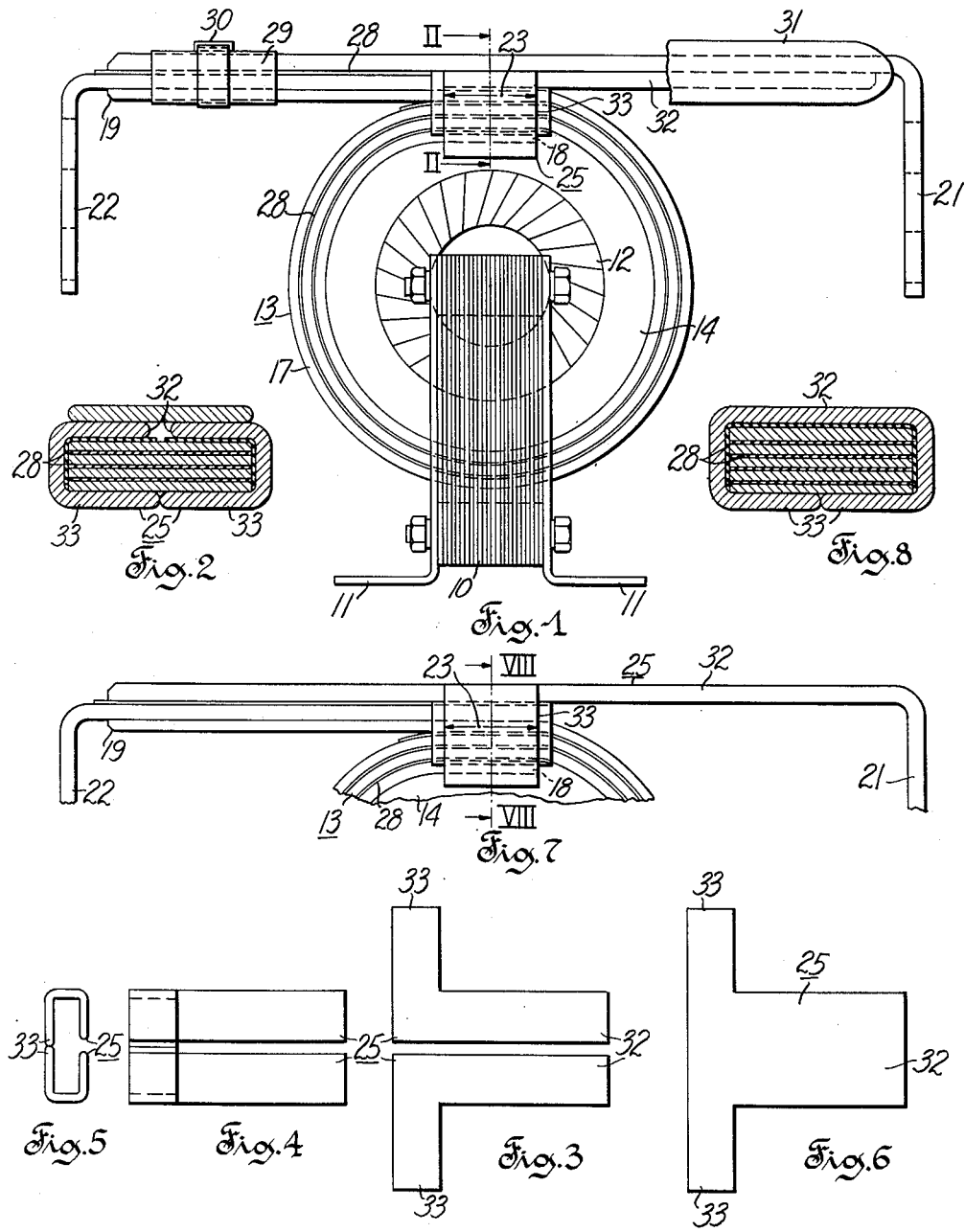

United States Patent Office 2,764,744
Patented Sept. 25, 1956

2,764,744

CURRENT TRANSFORMER CONSTRUCTION

Herman C. Dieringer, Milwaukee, Wis., assignor to Allis-Chalmers Manufacturing Company, Milwaukee, Wis.

Application October 7, 1954, Serial No. 460,950

5 Claims. (Cl. 336—68)

This invention relates to an electrical magnetic induction apparatus and more particularly to improvements in construction of a current transformer.

Current transformers are often provided with a primary winding whose current carrying conductor has large cross sectional areas to permit the winding to be serially connected with an electrical line. As the main electrical lines are normally bar stock type bus bars and the number of bends and twists necessary to connect the bus bars to auxiliary indicating equipment or to terminals is kept at a minimum, it becomes desirable to construct the current transformer with the primary winding totally contained in the same general plane. A primary winding so contained in the same general plane will permit the current transformer to be inserted in the straight run section of a bus bar without realignment of the bus bar.

It is an object of this invention to provide a current transformer construction in which the primary winding is contained in one and the same general plane, with its constituent parts being generally symmetrical with respect to that plane.

Another object of this invention is to provide a current transformer with a primary winding which will permit suspension of the entire current transformer from the primary winding.

Another object of this invention is to provide a current transformer with a primary winding of rugged and simple design so as to permit utilization of mass production techniques in the manufacture of the component parts.

Objects and advantages other than those above set forth will be apparent when read in connection with the accompanying drawings, in which:

Fig. 1 shows a current transformer construction in elevation with the major portion of the covering insulation broken away, embodying the invention hereinafter described;

Fig. 2 is a view in section along line II—II of Fig. 1;

Fig. 3 is a view showing as a development, the juncture member of the primary winding showing the use of two L-shaped parts comprising the juncture member;

Fig. 4 is a plan view showing the juncture member after forming thereof;

Fig. 5 is an end view of Fig. 4;

Fig. 6 is a development of the juncture member made as a singular T-shaped piece;

Fig. 7 is a fragmental view in elevation of the primary winding in the current transformer construction in which the juncture member is integrally formed with one of the leads; and Fig. 8 is a view in section along line VIII—VIII of Fig. 7.

Referring more particularly to the current transformer construction of Fig. 1, a core 10 is provided with and may be carried by mounting brackets 11. A secondary winding 12 is carried by core 10 and magnetically coupled therewith. A primary winding 13 is disposed about secondary winding 12 and is spaced apart therefrom by a resinous filler 14. Primary winding 13 is positioned in the same general plane as secondary winding 12.

Secondary winding 12 may be electrically connected with an indicating device (not shown), as is well known in the prior art, for measuring current flow in winding 12.

Current transformers are usually series connected with circuits carrying large magnitude currents. Therefore, the primary winding of the current transformer, which must withstand the maximum currents which may be expected in the circuit, is usually made of a good conducting material bar stock. Accordingly, copper bar stock is preferably utilized in manufacture of primary winding 13.

Primary winding 13 includes a spirally wound bar stock coil 17, of one or more turns, which coil has a beginning 18 and an end 19. Beginning 18 is positioned radially inward of end 19. End 19, further, extends beyond beginning 18 to form a radially spaced apart overlap 23.

Primary winding 13 further includes first lead 21, second lead 22 and juncture member 25. Juncture member 25 has a body portion 32 formed of bar stock and a pair of strap portions 33 extending laterally outward from the opposite sides of body portion 32. First lead 21 may be mechanically and electrically joined to body portion 32, as shown in Figs. 1 and 2, or may be made integral with body portion 32 of juncture member 25 as shown in Figs. 7 and 8.

Referring to Figs. 1 and 2, first lead 21 may be mechanically and electrically joined to body portion 32 of juncture member 25 by any means known in the art, such as resistance brazing of body portion 32 to first lead 21. Strap portions 33 of juncture member 25 are joined in like manner to beginning 18 of coil 17. End 19 is joined in like manner to second lead 22.

Juncture member 25 may be stamped from a strip of good conductor material by a stamping machine. To facilitate manufacture in this manner, juncture member 25 is stamped in a T-shaped development form as shown in Fig. 6. This T-shaped development is the basic configuration of juncture member 25. A refinement of the basic configuration is shown in Fig. 3 in which the member 25 is split longitudinally through the body portion 32 to form a pair of L-shaped development pieces 32, 33. L-shaped development pieces 32, 33 are then formed by bending into the desired shape for juncture member 25 shown in Figs. 4 and 5.

The juncture member 25 may also be made in a unitary piece having a T-shaped development as shown in Fig. 6. The T-shaped piece is also formed by bending strap portions 33 into the desired cross section as shown in Fig. 8.

Juncture member 25, whether of a T or L-shaped development, may be integrally formed with first lead 21 as shown in Figs. 7 and 8.

Means such as insulation 28 are provided for electrically isolating first lead 21 and juncture member 25 from end 19 of coil 17 and from second lead 22.

Primary winding 13 is generally symmetrical with respect to a common or general plane, thereby substantially balancing the forces resulting from current flow therethrough. The components of primary winding 13, such as coil 17, leads 21, 22 and juncture member 25, further may be said to be contained in one and the same general plane.

As to operation of the current transformer, assuming the current flow to be from first lead 21 in primary winding 13 to second lead 22 thereof, the primary current will flow along the following path: From first lead 21 to juncture member 25 along body portion 32 through strap portions 33 to beginning 18 of coil 17, thence through coil 17 to end 19 of coil 17 and to second lead 22. This primary current flow will induce a voltage into secondary winding 12. Secondary winding 12, as a result, produces a current very low compared to the primary current which may therefore be conducted directly to a suitable indicator such as an ammeter (not shown) serially connected with secondary winding 12, as is well known in the art.

The components of winding 13 may be rigidly fastened together in any manner known in the art, to aid in the ability of leads 21, 22 to carry the transformer. A wrapping of fish paper 29 is provided about leads 21, 22, insulation 28 and end 19 and a metal band 30 clamps these parts firmly together. A similar structure may be used to clamp lead 21 with juncture member 25.

The entire current transformer with the exception of the connecting portions of leads 21, 22 and brackets may be covered with any desired coating or covering such as a resinous plastic 31.

Core 10 of the current transformer is provided with brackets 11 for mounting the current transformer when it is desired to so mount it. However, primary winding 13 of Fig. 1 being reenforced, permits mounting of the current transformer on leads 21, 22 only, no further mounting structure being necessary.

When the reenforced feature of the current transformer construction of Fig. 1 is not desired the construction shown in Figs. 7 and 8 may be utilized. This construction eliminates a separate juncture member 25 and integrates first lead 21 with juncture member 25 to effect connection thereof to beginning 18 of coil 17.

The particular embodiment of the invention illustrated and described herein is illustrative only and the invention includes such other modifications and equivalents as may readily appear to those skilled in the art and in the scope of the appended claims.

It is claimed and desired to secure by Letters Patent:

1. In a current transformer, the combination comprising: a core, primary and secondary windings inductively coupled with each other and said core, said primary winding formed symmetrically with respect to a common plane with a single layer spirally wound conductor having an inner end at the winding inner circumference and having an outer end at the winding outer circumference and overlapping said inner end, a first lead in said plane and a second lead in said plane substantially parallel to said first lead, a juncture member electrically and mechanically joining said first lead to said inner end, said second lead electrically and mechanically joined to said outer end, said first and said second leads and said juncture member being arranged symmetrically about said common plane, and means electrically isolating the turns of said spirally wound conductor from each other and electrically isolating said member from direct contact with said second lead.

2. In a current transformer, the combination comprising: a core, primary and secondary windings inductively coupled with each other and said core, said primary winding formed symmetrically with respect to a common plane with a single layer spirally wound conductor having an inner end at the winding inner circumference and having an outer end at the winding outer circumference and overlapping said inner end, a first lead in said plane and a second lead in said plane substantially parallel to said first lead, a juncture member electrically and mechanically joining said first lead to said inner end, said second lead electrically and mechanically joined to said outer end of said winding forming a tangential continuation thereof, said first and said second leads and said juncture member being arranged symmetrically about said common plane, and means electrically isolating the turns of said spirally wound conductor from each other and electrically isolating said member from direct contact with said second lead.

3. In a current transformer, the combination comprising: a core, primary and secondary windings inductively coupled with each other and said core, said primary winding formed symmetrically with respect to a common plane with a single layer spirally wound strip conductor having an inner end at the winding inner circumference and having an outer end at the winding outer circumference and overlapping said inner end, a first lead in said plane and a second lead in said plane parallel to said first lead, a juncture member integrally formed with said first lead mechanically clamping said conductor to electrically and mechanically join said first lead to said inner end, said second lead electrically and mechanically joined to said outer end of said conductor forming a tangential continuation thereof, said first and said second leads and said juncture member being arranged symmetrically about said common plane, and means electrically isolating the turns of said spirally wound conductor from each other and from said member whereby said leads of said transformer may be inserted in a straight run section of a bus bar without realignment of the bus bar.

4. In a current transformer, the combination comprising: a core, primary and secondary windings inductively coupled with each other and said core, said primary winding formed symmetrically with respect to a common plane with a single layer spirally wound strip conductor having an inner end at the winding inner circumference and having an outer end at the winding outer circumference and overlapping said inner end, a first lead in said plane and a second lead in said plane substantially parallel to said first lead, a juncture member comprising a T-shaped development joined to said first lead and having its lateral extending strip portions turned to extend radially across opposite edges of said conductor with end portions thereof electrically and mechanically joining said inner end to mechanically clamp said spirally wound conductor, said second lead electrically and mechanically joined to said outer end of said conductor forming a tangential continuation thereof, said first and said second leads and said juncture member being arranged symmetrically about said common plane, and means electrically isolating the turns of said spirally wound conductor from each other and from said member, whereby said leads of said transformer may be inserted in a straight run section of a bus bar without realignment of the bus bar.

5. In a current transformer according to claim 3 wherein, said juncture member comprises a pair of elements having an L-shaped development positioned back to back with the lower legs of said elements constituting the laterally extending strip portions.

References Cited in the file of this patent
UNITED STATES PATENTS

| | | |
|---|---|---|
| 838,916 | Thullen | Dec. 18, 1906 |
| 1,235,081 | Torchio et al. | July 31, 1917 |